July 21, 1959  T. J. SCARNATO ET AL  2,895,277
MOWER OPERATING MECHANISM
Filed Jan. 17, 1957  2 Sheets-Sheet 1

Inventors:
Thomas J. Scarnato
Max G. Zielinski
Samuel E. Hilblom

Paul O. Pippel
Atty.

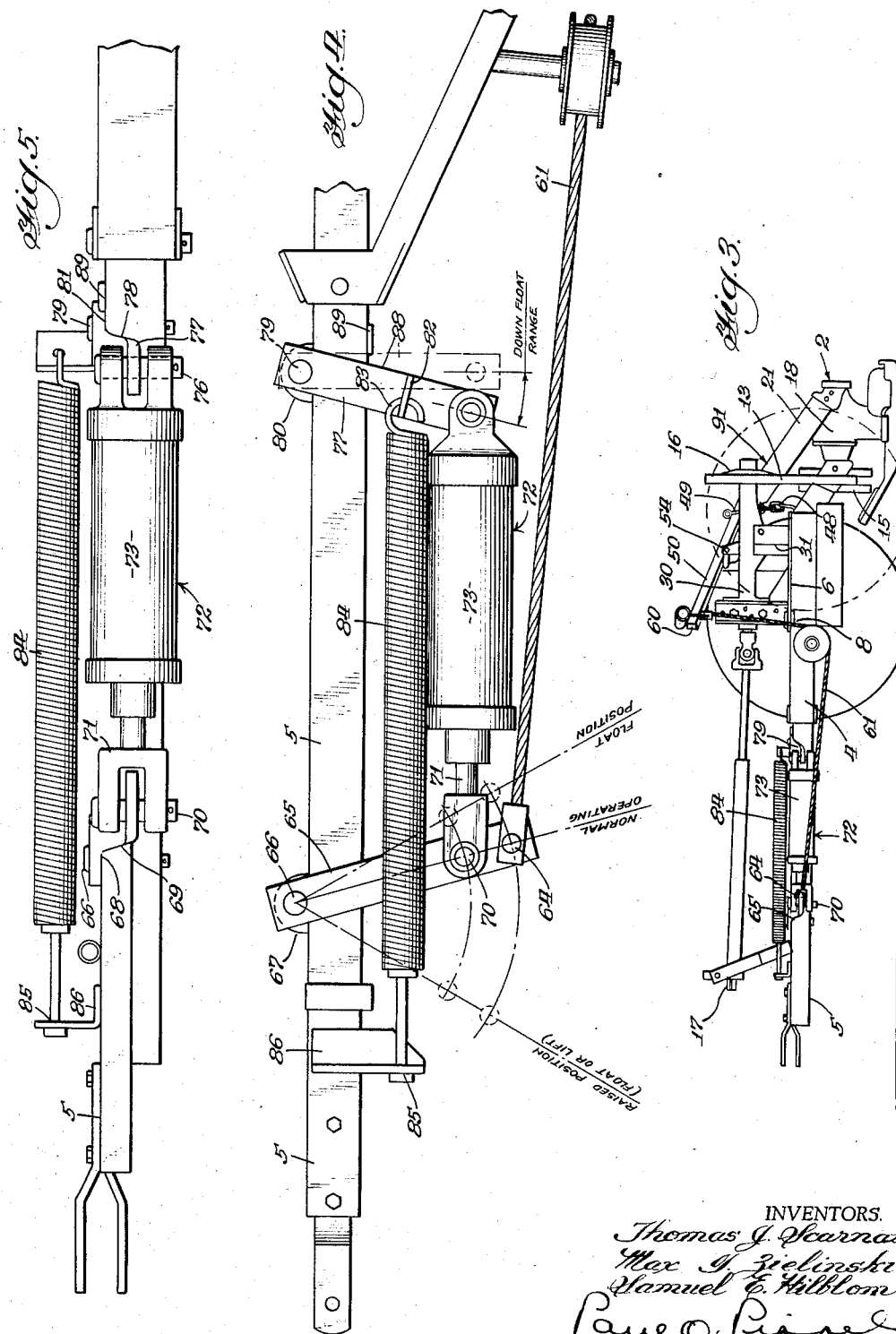

United States Patent Office 2,895,277
Patented July 21, 1959

2,895,277

MOWER OPERATING MECHANISM

Thomas J. Scarnato, Park Ridge, and Max I. Zielinski and Samuel E. Hilblom, Chicago, Ill., assignors to International Harvester Company, a corporation of New Jersey Application January 17, 1957, Serial No. 634,641

13 Claims. (Cl. 56—25)

This invention relates to mowers and more particularly to a novel mechanism for lifting a mower to several operating positions and tilting the mower bar and including means for holding the bar in transport position.

The general object of the invention is to provide a novel operating mechanism wherein the parts are continuously maintained in tension to prevent and reduce wear as is common in current constructions where the lifting linkages are slack and at the same time to arrange the mechanism so that it presents a minimum interference in the operation of the mower.

A more specific object of the invention is to provide a novel hydraulic lift system for a mower wherein the cylinder is floatingly mounted and the linkage is counterbalanced by a spring arrangement paralleling the cylinder and which operates in series with the cylinder when the cylinder is actuated to operate the linkage to lift and tilt the mower bar.

These and other objects of the invention will become more apparent from the specification and the drawings wherein:

Figure 3 is a side elevational view;

Figure 4 is an enlarged plan view of the cylinder and spring mounting and associated portion of the operating linkage on an enlarged scale; and Figure 5 is a side elevational view of the structure shown in Figure 4 with portions removed for clarity.

Figure 1:
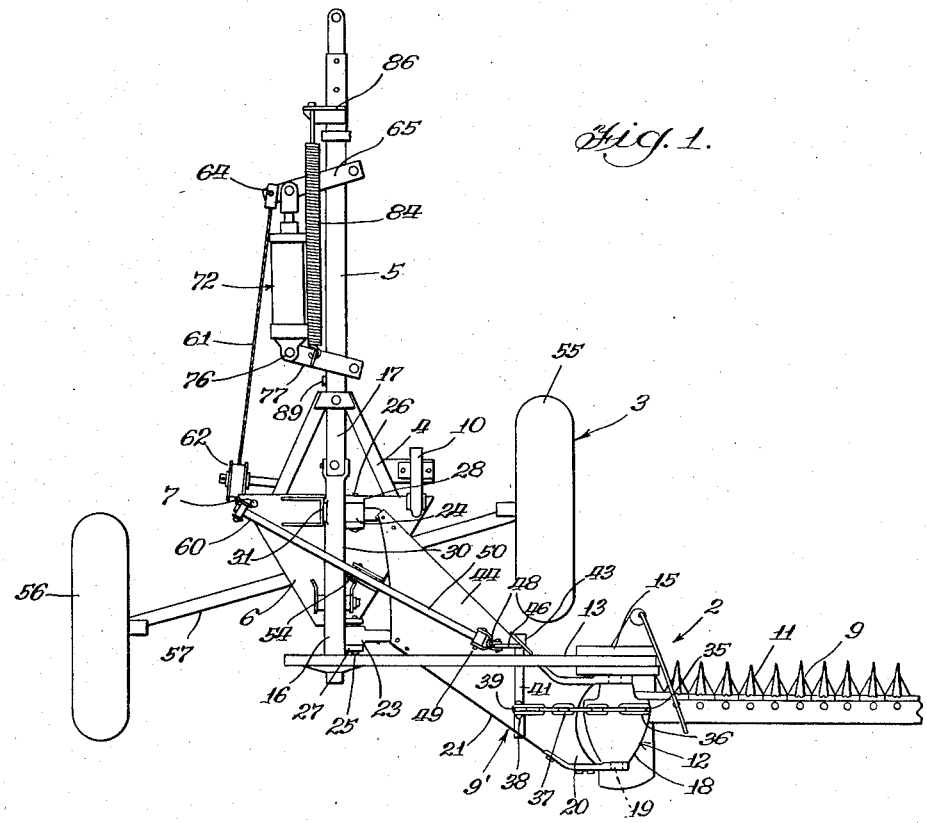
Figure 1 is a plan view of the mower structure incorporating the invention.

Describing the invention in detail, the mower generally designated 2 is herein shown merely for purposes of illustration as of the trail-behind type and comprising a wheel and axle assembly 3 which supports a support framework 4 which is rigidly secured to a fore-and-aft extending draft beam 5, the frame 4 supporting a mower frame 6 thereon for slidable movement about a vertical axis 7 which is afforded by a bolt 8 interconnecting the trapezoidal plate-like assembly 6 with the frame structure 4 for rotation about a substantially vertical axis in a generally horizontal plane upon the mower bar 9 of the cutting or implement part mechanism 9' striking an obstruction with attendant tripping of the spring latch 10 which releasably interconnects the frame 4 with the frame 6 at a point opposite the axis 7 that is at the opposite side of the medial line of the mower structure or trailer.

The sickle 11 of the mower assembly or implement part 9 may be driven by means such as shown in U.S. Patent 2,616,234 and generally indicated 12 but which is substantially of the form shown in a U.S. application in the name of John R. Orelind, filed June 22, 1956, Serial No. 593,156 for Balanced Head Mower, now U.S. Patent 2,824,416. The driving mechanism 12 is powered by a belt 13 which drives an input driving means 15 in the form of a pulley. The belt is driven by a pulley and drive shaft structure 16 which has a knuckled shaft assembly 17 which extends over the draft beam 5 as seen in Figure 3 and is adapted for connection to the power take-off of an associated tractor, not shown.

The inner end of the mower assembly is connected via the housing 18 of the driving mechanism 12 on the axis of the input shaft 19 thereof that is on a substantially horizontal axis to the outer end 20 of a channel shaped combined coupling and drag arm structure 21 which is in the form of a plate, the structure 21 being provided with inner end hinge means 23, 24 which are coaxial and which are hinged by the pins 25 and 26 (Figure 1) to suitable hinge means 27, 28 connected to the plate portion 6, and in the present instance the hinge means 27 and 28 being seen as formed on the shaft-carrying tube 30 which in turn is suitably connected by brackets 31 to the plate 6.

Figure 2:
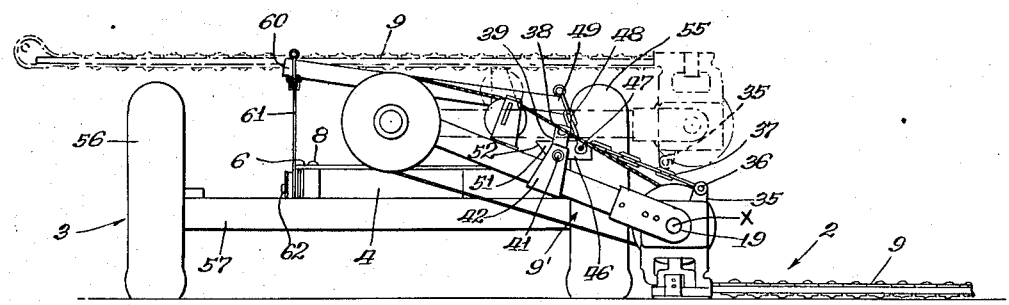
Figure 2 is a rear elevational view.

The operating mechanism for raising and lowering the mower bar and for tilting the same comprises an upstanding lever arm 35 which is disposed outwardly of the axis X defined by the shaft 19 and extending upwardly therefrom and the upper end of the arm 35 is pivotally connected to a generally horizontal fore-and-aft extending axis as at 36 to the outer end of the flexible member which may be in the form of a chain 37, the other end of the member 37 being suitably connected as at 38 to an upstanding arm 39 disposed inwardly of the axis X and projecting upwardly in the operating position of the mower bar from a rockshaft 41 which is supported for rotation on brackets 42, 43 disposed on a fore-and-aft axis, the shaft 41 overlying the top side 44 of the structure 21. The rockshaft is provided with another arm 46 which is angularly disposed to the arm 39 and in effect with the rockshaft forms the bell crank therewith, the arm 46 in the operating position of the mower extending from the shaft 41 toward the mower, and at its outer extremity being pivotally connected as at 47 (Figure 2) to the lower end of a flexible member in the form of a chain 48 which at its upper end is connected to one end 49 of a lever 50 of the first class. The shaft 41 has, preferably as an extension of the lever 46, a stop member 51 which limits rotation of the rockshaft through abutment of its diagonal bottom edge 52 with the top side 44 of the structure 21. Thus it will be readily realized, and assuming the parts are in the position shown in Figures 1 and 2, that gravity provides an initial downward bias on the cutting mechanism 9' and that initial rotation of the rockshaft 41 in a counterclockwise direction will rotate the mower bar 9 about the axis 19 and the mower bar will be tilted upwardly until the surface 52 engages with the topside 44 of the structure 21. Rotation of the shaft 41 and the pull on the linkage 37 and rotation of the mower bar 9 about the axis X would cease. The entire assembly would then pivot about the hinges 23 and 24, and more specifically the pins 25 and 26, whereby raising the entire structure upwardly attendant to rotation of the lever 50 in a counterclockwise direction (Figure 2) about the fulcrum 54 on which the beam 50 is pivoted, said fulcrum being in the form of a bracket which is connected to the plate 6 and being located essentially, or approximately to the center of gravity of the mower structure which is approximately between the angularly offset wheels 55 and 56 and on the interconnecting axle structure 57. It will be realized that the beam 50 crisscrosses the axle structure 57 and that the load is disposed approximate to and balanced fore-and-aft and laterally on the rearward axle assembly 3. The other or forward end 60 of the beam member 50 is connected to a flexible member 61 which is in the form of a cable which is passed beneath a pulley or sheave 62 suitable mounted beneath the end 60 of the beam member 50 on frame 4 and then the cable proceeds forwardly and connects as at 64 on a substantially vertical axis to the outer end of a lever 65 of the third class.

The lever 65 swings over the beam member 5 and at its inner end is pivotally connected as at 66 to an ear 67 on the far side of the beam member 5. The lever 65 adjacent to its pivot 66 is slidably supported as at 68 on the beam member 5 for rotation fore-and-aft about the vertical axis 66.

Intermediate its ends the fore lever 65 may be offset as at 69 and pivotally connected intermediate its ends as at 70 to the piston 71 of the hydraulic motor or ram 72, the cylinder 73 of which, as well as the piston, laying substantially in the horizontal plane of the beam member 5 and extending generally parallel thereto and the cylinder at its rear end being pivotally connected on a substantially vertical axis as of 76 to the outer end of a third class lever 77 which is offset upwardly intermediate its ends as at 78 and the opposite end being pivotally mounted on a substantially horizontal axis as at 79 to an ear 80 on the far side of the beam member 5. The portion adjacent to the pivot 79 is slidably supported as at 81 for movement fore-and-aft, as shown by the legends in Figure 4. The lever 77 is provided intermediate its ends with an upstanding lug 82 to which one end 83 of a counterbalancing spring 84 is connected, the other end of the tension spring 84 being connected as at 85 to a bracket 86 which is mounted and connected to the top-side of the beam member 5 forwardly of the forward link 65. It will be observed that spring 84 being always in tension will tend to rotate the lever 77 forwardly, that is, in a clockwise direction (Figure 4) whereupon, assuming that the cylinder or hydraulic motor or ram 72 is inactive will telescope the cylinder and the piston 71 whereby the same form a rigid push structure or column which in turn pushes or swings the link 65 about the axis 66 forwardly and pulling on the cable 61 forwardly and thus pulling the end 60 of the lever 50 downwardly whereby raising the output end 49 of the lever 50 upwardly and tensioning the linkage 48 and swinging the rock shaft at 41 in a counterclockwise direction (Figure 2) thus tensioning the linkage 37 and counterbalancing the mower assembly 9 about the axis X and also providing a counterbalancing lift on the structure 21.

In order to lift the mower frame or to tilt the mower bar the hydraulic piston and cylinder are actuated so that the same extend whereby the levers 65, 77 are spread out until the lever 77 abuts with its rear edge 88 as shown in phantom lines against the stop 89 which is disposed and connected to the member 5 rearwardly of the link 77 on the side of the beam 5 opposite that at which the pivot 79 is disposed. As soon as the link 77 stops rotating it in effect becomes a rigid member and thus the piston 71 travels forwardly rotating the lever 65 forwardly or in a clockwise direction (Figure 4) whereby pulling the cable 61 forwardly and pulling the input end 60 of the balance beam 50 downwardly whereby the output end 49 of the balance beam lifts with attendant rotation of the rockshaft assembly 41 thereby pulling on the chain 37 leftwardly (Figure 2) and rotating the entire mower structure about the axis X thereby pulling the mower bar. Continued actuation of the hydraulic motor rotates the shaft assembly 41 to a point where the bottom edge 52 of the stop member 51 engages with the top side 44 of the connecting structure 21 so that the relative rotation between the mower assembly 9 and the structure 21 ceases and the entire structure 9 and 21 is bodily lifted about the axis of the pins 25, 26. It will be seen that, if desired, after the mower assembly is raised the mower bar may be folded over so that the structure 21 is disposed substantially horizontally, and the mower assembly 9 will be folded over it and will be held in that position by the chain 37 inasmuch as the lever 35 will have been swung under the axis X, as best seen in phantom lines in Figure 2. In order to place the mower back in operating position the operator, of course, would swing the mower upwardly and have it angled outwardly and then he would reactivate the hydraulic unit exhausting the fluid therefrom whereupon the parts would then lower and the hydraulic unit would assume the position shown in solid lines in Figure 4 and this action would continue until the hydraulic unit would become a solid member and then the entire assembly would be pulled forwardly and the load would be imposed into the tension spring 48.

What is claimed is:

1. In a mower having a frame, a cutting mechanism carried thereby for vertical movement from a lowered operating position in which it tends to remain because of its own weight and a raised transport position to which it must be forcibly moved, the improvement comprising: a pair of laterally spaced levers pivotally supported at corresponding ends on said frame, a ram extending between and pivotally connected to said spaced levers, a linkage operatively interconnecting one of said levers with said cutting mechanism in tension, spring means connected between the other lever and the frame and acting through said other lever and ram in a direction applying a tension load to said linkage through said one lever, and stop means on the frame abuttable with said other lever to limit spreading movement thereof with respect to said one lever upon expansion of the ram to provide a fixed anchor therefor.

2. In a mower, the combination of a frame, a mowing machine carried thereby and having a cutter bar assembly, a pivotal mounting for the cutter bar assembly enabling vertical swinging movement of the cutter bar assembly between operating and transport positions, lifting means for raising, lowering and counterbalancing said cutter bar assembly comprising first and second levers pivotally supported on the frame and a ram operatively interconnecting said levers, said lifting means having floating motion about the pivots of said levers spring means operative between the frame of said lifting means for urging the same in a lifting direction, a tension linkage connection operatively interconnecting said cutter bar assembly with the said lifting means through a connection to one of the levers, said spring means and ram arranged in series, and means on the frame and cooperative with the lifting means for limiting floating movement of said lifting means to provide a reactance for the ram.

3. In an implement having a frame and an implement part carried thereby for vertical movement from a lowered operating position in which it tends to remain because of its own weight and a raised transport position to which it must be forcibly moved, the improvement comprising: a tension linkage connected between said implement part and frame and including spring means and an hydraulic ram and means including said linkage and mounting said ram on the frame and interconnecting said spring means and ram in series.

4. The invention according to claim 3 and further characterized in that said linkage comprises first and second levers pivotally mounted on the frame and said hydraulic ram operatively interconnecting said levers for movement together in a common direction or for spreading-apart movement upon actuation of said ram, said spring means connected between one of said levers and the frame for swinging said levers together through said ram in a tensioning direction of the linkage, and means on the frame abuttable with said one lever for limiting its spreading movement to provide a fixed reaction point for the ram.

5. In an implement having a frame and an implement part carried by the frame for movement selectively from and to a first position toward which the implement part has an initial bias, the improvement comprising: a lever pivoted on the frame for movement relative thereto in a first direction in opposition to the initial bias, and also in a second direction in accord with the initial bias of the implement part; spring means having a connection between said lever and the frame for biasing the lever in its first direction and yieldable to accommodate movement of the lever in its second direction; load-transmitting means securing the lever to the implement part and normally loaded between said lever and part and including ram means in compression in the connections of said load-transmitting means between said lever and said part.

6. The invention according to claim 5 and stop means on the frame engageable with said lever for limiting movement thereof in said first direction upon expansion of said ram means to provide an anchor therefor so that said ram means is effective to move said part in said second direction.

7. The invention according to claim 5 and said lever pivoted at one end to the frame and at its opposite end to said ram means and said spring means connected to the lever intermediate the ends thereof.

8. The invention according to claim 7 and said load-transmitting means comprising a lever to the third class and pivoted at one end to the frame and intermediate its ends to said ram means and at its other end to a portion of load-transmitting means between the same and the implement part.

9. In a trailer-type mower having an ambulatory frame including a fore and aft extending tongue structure, a cutting mechanism including a coupling structure pivoted at one end to the frame on a fore and aft axis for vertical swinging movement, a mower assembly pivoted to the other end of the coupling structure for vertical pivotal movement, a linkage for swinging said mower assembly upwardly and then bodily swinging said assembly upwardly with said structure about the pivot of the latter comprising a lever of the first class pivoted intermediate its ends on the frame and extending transversely thereof, and having an output end at one side of the frame and disposed above said structure and connected to said linkage and having an input end at the opposite side of the frame, operating means including ram means and counterbalancing spring means arranged in series mounted upon said tongue, and load-transmitting means having a connection with said input end of the lever and said operating means.

10. In a trailer-type mower having an ambulatory frame including a fore and aft extending tongue, a cutting mechanism carried by the frame for vertical movement between operating and transport positions, fore and aft levers pivoted at one of their corresponding ends to said tongue on generally vertical axes, load-transmitting linkage connected between said fore lever and said mechanism in lifting relation to the latter, a tension spring connected to the aft lever and extending forwardly therefrom and anchored to a forward portion of the tongue, ram means extending generally parallel to the tongue between and connected at opposite ends to respective levers, and a stop on the frame rearwardly of said aft lever for limiting rearward swinging movement thereof as said ram means is expanded.

11. In a trailer mower, a wheel supported frame, a cutting mechanism extending laterally outwardly of the frame rearwardly of the center of gravity thereof and connected thereto for vertical swinging movement, a lever having input and output points and superposed on said frame and extending diagonally fore and aft and having a fulcrum approximately on said center of gravity, load-transmitting linkage connected between the output point of said lever and said cutting mechanism in lifting relation to the latter, and operating means connected to said input point on the lever for operating the same.

12. In a mower having a frame, a coupling structure extending laterally of the frame and connected thereto for vertical swinging movement, a mower assembly disposed in extension to said structure, said assembly and structure pivotally interconnected at adjacent ends on a fore and aft axis accommodating vertical swinging movement of the assembly, a lever arm connected to the mower assembly and upstanding therefrom in the operating position thereof, load-lifting means including a flexible linkage connected to the distal end of the lever arm and extending therefrom transversely of said axis toward said coupling structure and disposed above said axis in the operating position of said mower assembly, said mower assembly swingable upwardly and inwardly about said axis to a folded transport position whereat said assembly overlaps said structure and disposing said lever arm below said axis with the weight of said assembly biasing said lever arm outwardly against the resistance of said flexible linkage so that said linkage supports said assembly in said folded transport position.

13. In a mower having a frame, a coupling structure extending laterally of the frame and connected thereto for vertical swinging movement about a fore and aft axis, a mower assembly disposed in extension to said structure, said assembly and structure pivotally interconnected at adjacent ends on a fore and aft axis accommodating vertical swinging movement of the assembly, a lever arm connected to the mower assembly and outstanding therefrom, lifting means including a flexible linkage connected to said lever arm for initially raising and lowering said assembly about its axis of pivot and then conjunctively raising and lowering the mower assembly and coupling structure about said axis of pivot of the latter, said mower assembly swingable upwardly and inwardly of its axis of pivot to a folded transport position whereat said assembly overlaps said structure and is supported in a substantially horizontal position.

References Cited in the file of this patent

UNITED STATES PATENTS

| | | |
|---|---|---|
| 2,463,726 | Synck et al. | Mar. 8, 1949 |
| 2,520,107 | Vutz | Aug. 22, 1950 |
| 2,580,266 | Abgarian | Dec. 25, 1951 |
| 2,588,003 | Holmes | Mar. 4, 1952 |
| 2,617,242 | Iverson | Nov. 11, 1952 |
| 2,637,966 | Rickey | May 12, 1953 |
| 2,743,568 | Elfes | May 1, 1956 |
| 2,744,374 | Loughan | May 8, 1956 |
| 2,779,145 | Smith | Jan. 29, 1957 |